United States Patent [19]

O'Connell

[11] Patent Number: 5,109,411
[45] Date of Patent: Apr. 28, 1992

[54] TELEPHONE HANDSET CRADLE MOUNT

[75] Inventor: Joseph J. O'Connell, Albuquerque, N. Mex.

[73] Assignee: Scientific Dimensions, Albuquerque, N. Mex.

[21] Appl. No.: 542,258

[22] Filed: Jun. 21, 1990

[51] Int. Cl.⁵ .................. H04M 1/00; E04G 3/00
[52] U.S. Cl. .................... 379/454; 379/455; 248/284; 248/278
[58] Field of Search ........... 379/454, 455, 426, 428, 379/447, 449; 248/183, 278, 558, 284, 222.1

[56] References Cited

U.S. PATENT DOCUMENTS

| | | | |
|---|---|---|---|
| 457,784 | 5/1979 | May | 248/284 |
| 2,481,271 | 9/1949 | Willey | 179/148 |
| 2,663,764 | 12/1953 | Holmes | 379/454 |
| 2,712,039 | 6/1955 | Holmes | 379/454 |
| 3,946,977 | 3/1976 | Kuhfus | 379/454 |
| 4,240,129 | 12/1980 | Kawazoe | 248/222.1 |
| 4,472,606 | 9/1984 | Krolopp et al. | 179/146 R |
| 4,747,136 | 5/1988 | Kiesewetter | 377/455 |
| 4,776,553 | 10/1988 | Kabayashi | 248/558 |
| 4,797,916 | 1/1989 | Kojima | 379/454 |

FOREIGN PATENT DOCUMENTS

| | | | |
|---|---|---|---|
| 0241345 | 12/1986 | German Democratic Rep. | 379/454 |
| 0018249 | 1/1986 | Japan | 379/454 |
| 0300698 | 12/1988 | Japan | 379/454 |

OTHER PUBLICATIONS

Advertisements of mounts of TEC Cellular Technology by Cellular Antenna Co.; Quick Release Plate; and mount called *Multi-Position Head-Mount* of ORA Electronics; All in Mobile Product News, Apr., 1990 issue.
Flexi-Mount System brochure of Cellular Technology.
Brochure of Signal Measurement Company for "No Holes Clip on Dash/Console Mounts".

*Primary Examiner*—James L. Dwyer
*Assistant Examiner*—Jason Chan
*Attorney, Agent, or Firm*—Deborah A. Peacock; Donovan F. Duggan

[57] ABSTRACT

A cradle mount for mounting a cellular telephone handset cradle in a vehicle. The mount enables the cradle to be selectively and removably positioned at an angular orientation extending through a full 360 degrees, and enables the cradle to be tilted through an angle of approximately 180 degrees. A detachable mounting plate enables the handset to be removed from the mount. One or more elongate, pivotably connected extension bars may be interposed between the base of the mount and the rotatable, detachable mounting plate, so as to enable the mount to be installed at various places in vehicle cabs of different sizes, shapes and dimensions.

4 Claims, 5 Drawing Sheets

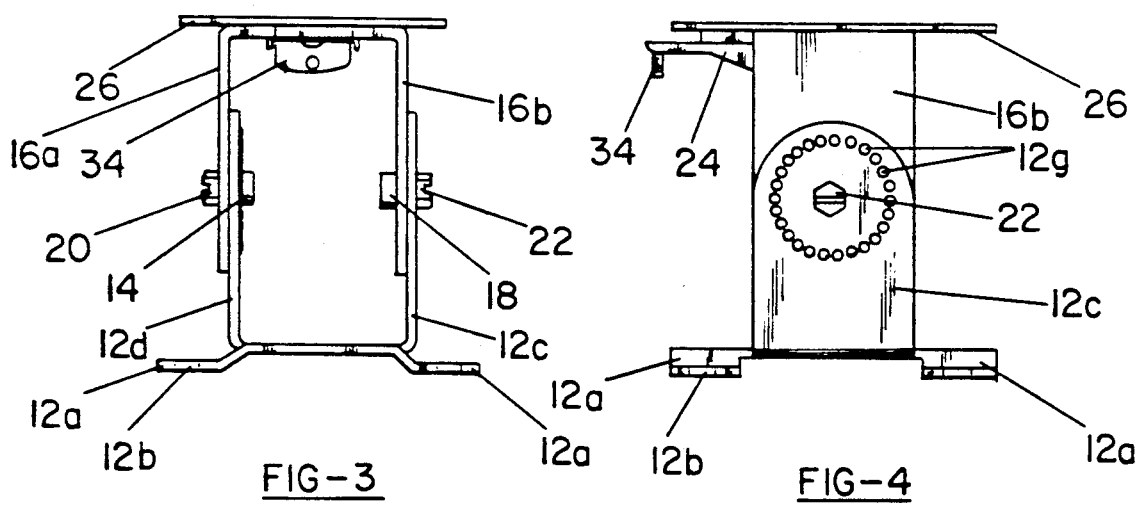
FIG-3
FIG-4
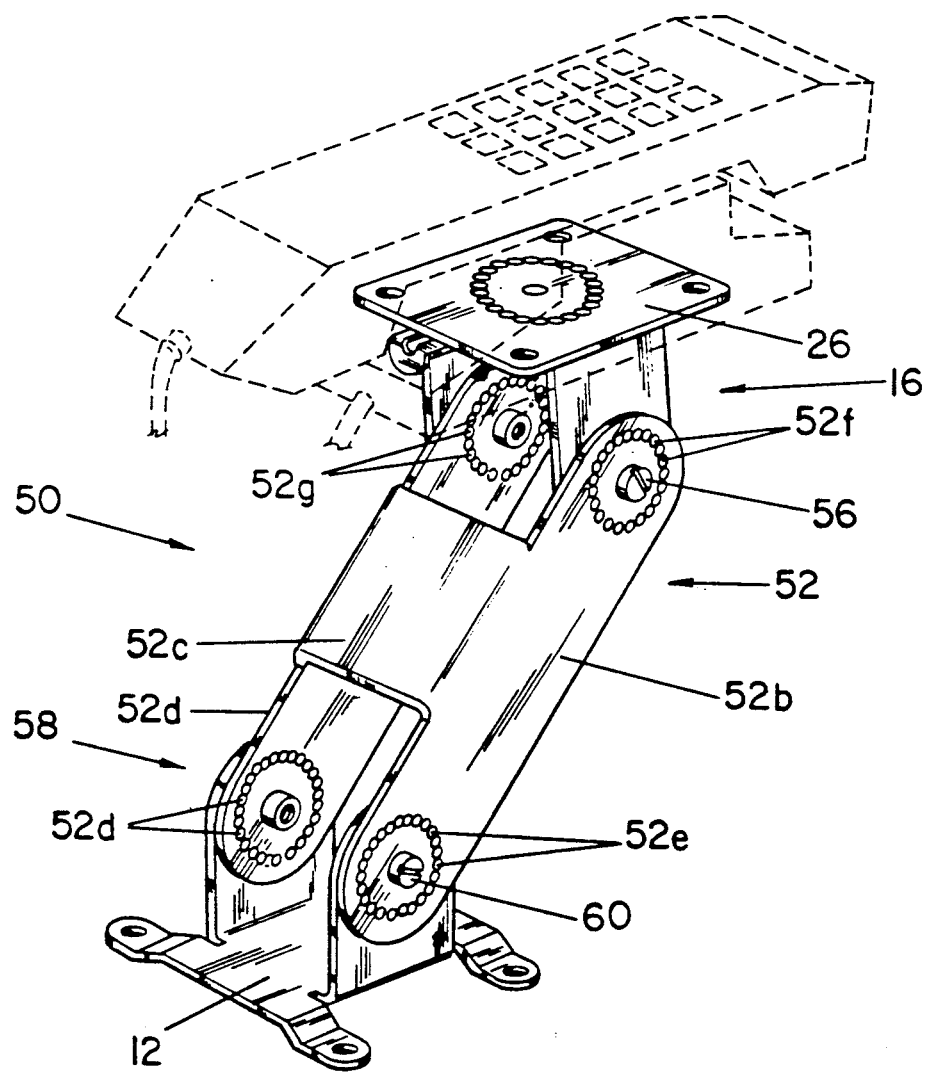
FIG-5

TELEPHONE HANDSET CRADLE MOUNT

BACKGROUND OF THE INVENTION

1. Field of the Invention (Technical Field)

The invention described and claimed herein is generally related to mounting devices for telephones and the like. More particularly, the present invention is related to devices for mounting a cellular telephone handset cradle in a vehicle.

2. Description of the Related Art Including Information Disclosed under 37 C.F.R. §§1.97-1.99 (Background Art)

The widespread advent of cellular telephones has resulted in a need for cellular phones to be installed in many kinds of vehicles, which have widely varying interior dimensions, shapes and sizes. In this regard, vehicles have dashboards of different sizes, shapes and orientations. Additionally, some vehicles with bucket seats have middle consoles or transmission housings of various sizes and shapes, which are generally positioned centrally between the front seats or below the dashboard. These differences in vehicle configuration, coupled with varying personal preferences as to the location of the telephone handset, has created a need for a mounting device for the cellular phone handset, which can enable the handset to be mounted in any of a number of different positions and orientations within the cab of the vehicle.

In this regard, most handsets for cellular or mobile telephones rest removably in a cradle which must be mounted within the vehicle. The previously available mounting systems for such handset cradles do not offer the versatility in positioning necessary to accommodate all the different vehicle designs and personal preferences.

For example, U.S. Pat. No. 4,776,553, issued Oct. 11, 1988, to Kobayashi, describes a clamshell-type cradle mount for a telephone handset which has only a very limited rotational adjustment range in two directions and very little standoff from the mounting surface.

U.S. Pat. No. 4,797,916, issued Jan. 10, 1989, to Kojima, also discloses a telephone handset cradle mount, which is pivotable in one dimension and over a limited angular range.

SUMMARY OF THE INVENTION

Disclosure of the Invention

Accordingly, the present invention provides a cradle mount for a telephone handset cradle, particularly a cradle for a cellular telephone handset. The mount includes a base plate having means for securing the base plate to a surface, which in a preferred embodiment include a set of offset, integral feet which enable the base plate to be affixed to a curved, irregular or carpeted surface. The base plate further includes a pair of upwardly extending support arms which are pivotably attached to a clevis. The clevis is detachably connected to a mounting plate, which is adapted to be affixed to and support a telephone handset cradle.

The pivotable connection between the upwardly extending support arms and the clevis preferably includes a swivel and lock assembly for selectively securing the clevis to the arms at a desired angle. In the preferred embodiment the swivel and lock assembly comprises a circular array of inwardly protruding detents in the upwardly extending support arms, with the clevis also including a pair of arms each having a circular array of cooperable indents. The cooperable detents and indents are engageable by a pair of fasteners connecting the pair of arms of the clevis to the pair of upwardly extending arms of the base plate. The arrays of indents and detents may be formed by punching, so as to form, in the sheet stock comprising the base plate and clevis, deformations which constitute a detent on one side and an indent on the opposite side, thereby facilitating interchangeability of parts and ensuring compatibility in assembly. The swivel and look assembly preferably includes circular arrays of twenty-four detents and cooperable indents, whereby the clevis can be selectively attached to the base plate at angular increments of approximately fifteen degrees.

The cradle mount may preferably include a snap slide fastener affixed to the underside of the clevis center plate, and a cooperable snap slide stud affixed to the mounting plate, for releasably connecting the mounting plate to the clevis. In the preferred embodiment the snap slide stud passes through a central bore in the clevis center plate, and the mounting plate and clevis center plate are provided with the same arrays of interlocking detents and indents as described above, so as to enable the mounting plate to be affixed to the clevis in any one of a number of rotational orientations. In a preferred embodiment two sets of twenty four detents and indents allow for twenty-four rotational orientations, at fifteen degree angular spacings.

One or two extension arms may be pivotably interposed between the clevis and the base plate, so as to increase the height and/or the angular range of the mount. These embodiments of the invention are particularly adapted to enabling the phone cradle mount to be affixed to the underside of a dashboard, or to the floor of a vehicle cab. In the preferred embodiments the extension arms are provided with the same punched detent/indent swivel and lock assemblies as described above, to permit the mount to assume a wide range of heights, positions and orientations.

Accordingly, it is one object of the present invention to provide a mount for a telephone handset cradle which permits the cradle to be located in a variety of positions and orientations within the vehicle.

It is also an object and purpose to provide a cradle mount which is tiltable and rotatable, and which may be selectively secured in a desired position.

It is another object and purpose of the present invention to provide a telephone handset cradle mount which resists vibration.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

In the Figures:

FIG. 3 is an end view of the embodiment shown in FIG. 1;

FIG. 4 is side view of the embodiment shown in FIG. 1;

FIG. 5 is an isometric view of a second preferred embodiment of the invention, having a single extension bar interposed between the clevis and the base plate;

Figure 1:
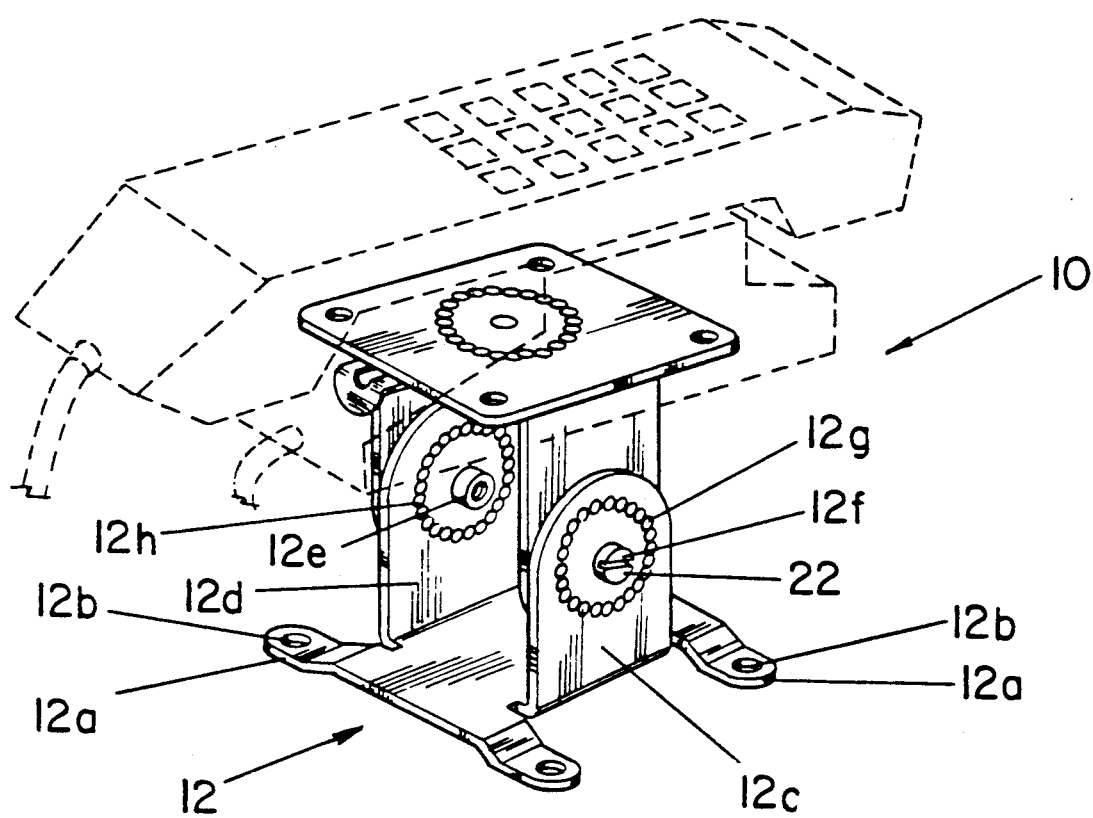
FIG. 1 is an isometric view of a first preferred embodiment of the telephone cradle mount of the present invention, showing a handset cradle and handset in phantom outline.

DETAILED DESCRIPTION OF THE PREFERRED EMBODIMENTS OF THE INVENTION (BEST MODES FOR CARRYING OUT THE INVENTION)

Referring to FIGS. 1 through 4, there is illustrated a first preferred embodiment of a cradle mount 10 constructed in accordance with the present invention. The mount 10 is adapted to support a cradle for a cellular telephone receiver, or handset, as shown in phantom outline in FIG. 1. It will be recognized that, although the mount 10 is intended primarily for handset cradles for cellular telephones, it may also be useful for supporting other cradles and/or receivers.

The mount 10 is particularly adapted for mounting on the top or front of a vehicle dashboard, where the handset cradle can be positioned relatively close to the dashboard. The mount 10 includes a base plate 12, which includes four integral mounting feet 12a. Each foot 12a includes a bore 12b for affixing the base plate 12 to a dashboard or other surface.

The base plate 12 further includes a pair of vertical support arms 12c and 12d. In the preferred embodiment, the base plate 12, including the feet 12a and the vertical support arms 12c and 12d, are all formed from a single piece of sheet stock cut and bent to the appropriate shape, with the arms 12c and 12d being bent upwardly as shown. Additionally, the feet 12a are bent through a compound bend so as to be offset from, yet parallel to, the main body of the base plate 12, so as to facilitate affixing of the base plate 12 to a curved, carpeted or irregular surface.

The two vertical support arms 12c and 12d include coaxial bores 12e and 12f, respectively. The support arms 12c and 12d are further provided with circular arrays of inwardly protruding detents 12g and 12h, respectively. The circular arrays of detents 12g and 12h are centered around the bores 12e and 12f on the insides of the arms 12c and 12d, respectively, and are associated with corresponding circular arrays of indents 12g and 12h formed on the outsides of the arms 12c and 12d. The individual indents and associated detents are formed by punching the sheet stock from the one side, so as to produce the inwardly protruding dents on the insides of the arms 12c and 12d and the indents on the outsides of arms 12c and 12d. In the preferred embodiment each array of detents and indents includes twenty-four detents and twenty-four corresponding indents, which are equally spaced at 15° increments around the circle of the array. It will be noted that each of the detents 12g and 12h includes an integral indent on the opposite side of the arm. The combination of detents and indents that are formed simultaneously by the punching process render the array of detents/indents interchangeable in some respects, and enable both the arrays of indents and the arrays of detents to be formed by the same process. Clearly, the positions of the detents and indents of the preferred embodiments could be reversed, if desired, so that indents could be positioned where detents are and vice versa. Too, greater or fewer than twenty-four indents and twenty-four detents could be provided for greater or lesser positioning selectability.

In one vertical support arm 12d there is installed a cylindrical screw thread nut 14 in the bore 12e of the arm 12d. The screw thread nut 14 is permanently inset into the bore 12e from the inside of the arm 12d.

The mount 10 further includes a clevis 16, which includes an integral, downwardly extending arms 16a and 16b, and a upper center plate 16c with a transversely extending integral ear 16d. The arms 16a and 16b include coaxial bores 16e and 16f, and circular arrays of detents 16g and 16h centered on the bores 16e and 16f, respectively. The detents 16g and 16h are formed in the same manner as described above with respect to the detents 12g and 12h. One arm 16b includes a screw thread nut 18 permanently inserted in the bore 16f from the inside of the arm 16b.

The clevis 16 is installed over the vertical support arms 12c and 12d such that clevis arm 16a is outside support arm 12d, and clevis arm 16b is inside support arm 12c. A screw 20 passes through the bore 16e and 12e in arms 16a and 12d to engage the nut 14; and a screw 22 passes through the bores 12f and 16f to engage the nut 18. In this manner, the inwardly protruding detents 16g of the clevis arm 16a engage the indents 12h on the outer surface of support arm 12d; and the inwardly protruding detents 12g of support arm 12c engage the indents 16h on the outer surface of clevis arm 16b. Once the screws 20 and 22 are tightened, the interlocking detents and indents prevent rotation of the clevis 16 relative to the base plate 12 about the axes of the screws 20 and 22. Loosening of the screws 20 and 22 allows the clevis 16 to be rotated relative to the base plate 12 and subsequently set at any one of various positions at 15° angular increments. The tips of the detents are rounded so as facilitate adjustment of the clevis angle when the screws 20 and 22 are loosened. When the screws 20 and 22 are tightened, the arrays of interlocking detents and indents form a secure, vibration-resistant connection between the clevis 16 and the base plate 12.

A snap slide fastener 24 is affixed to the underside of the center plate 16c of the clevis 16. The snap slide fastener 24 functions to removably attach the clevis 16 to a rectangular cradle mounting plate 26. The fastener 24 is attached to the clevis ear 16d by a rivet 28 (FIG. 2) which is flush clenched in a bore 16k in the clevis ear 16d.

The cradle mounting plate 26 includes a central bore 26a which is centered within a circular array of twenty four downwardly protruding detents 26b, which are formed in the same manner as described above with respect to detents 12g and 12h. The plate 26 also includes four corner holes 26c, which are sized and positioned to permit attachment of the plate 26 to a standard cellular handset cradle.

The mounting plate 26 also includes a downwardly protruding snap slide stud 30 which is flush clenched in the central bore 26a. The stud 30 extends through a central bore 16i in the center plate 16c of clevis 16, and is engaged by the snap slide fastener 24 as further described below. The center plate 16c also includes a circular array of twenty four upwardly opening indents 16j, which receive the detents 26b of the mounting plate 26.

The snap slide fastener 24 includes a guide plate 32 which is affixed to the underside of the center plate 16 by the rivet 28. The guide late 32 is located on the center plate 16c and secured against rotation with respect to the center plate 16c by means of an integral tab 32a which extends through a hole 16m in the center plate 16c. The guide plate 32 guides a latch 34, which slides within the guide plate. The latch 34 includes two integral arms 34a which straddle the rivet 28. In this regard, the rivet 28 is specially constructed to secure the guide plate 32 to the center plate 16c, while also allowing the latch 34 to slide inwardly and outwardly about the rivet 28. The latch 34 is also specially adapted so that when it is forced inwardly about the head of the stud 30, which protrudes through the bore 16i, the stud 30 and hence the mounting plate 26 are securely attached to the clevis. Moreover, since the mounting plate 26 is rotatable about the stud 30, the mounting plate 26 can be attached to the clevis 16 at any rotational orientation with respect to the clevis 16. More specifically, the mounting plate 26 can be rotated through a full 360 degree angle, and can be secured to the clevis 16 in any one of the twenty-four angular positions which are defined by the detents 26b and indents 16j.

It will be appreciated that the handset cradle can thus be positioned in any one of a number orientations on the mount 10. More specifically, the mounting plate 26 and its handset cradle can be both tilted with respect to the fixed base plate 12, and can also be rotated axially with respect to the base plate 12, thereby allowing a wide variety of fully adjustable handset mounting positions for each of access and use.

Figure 2:
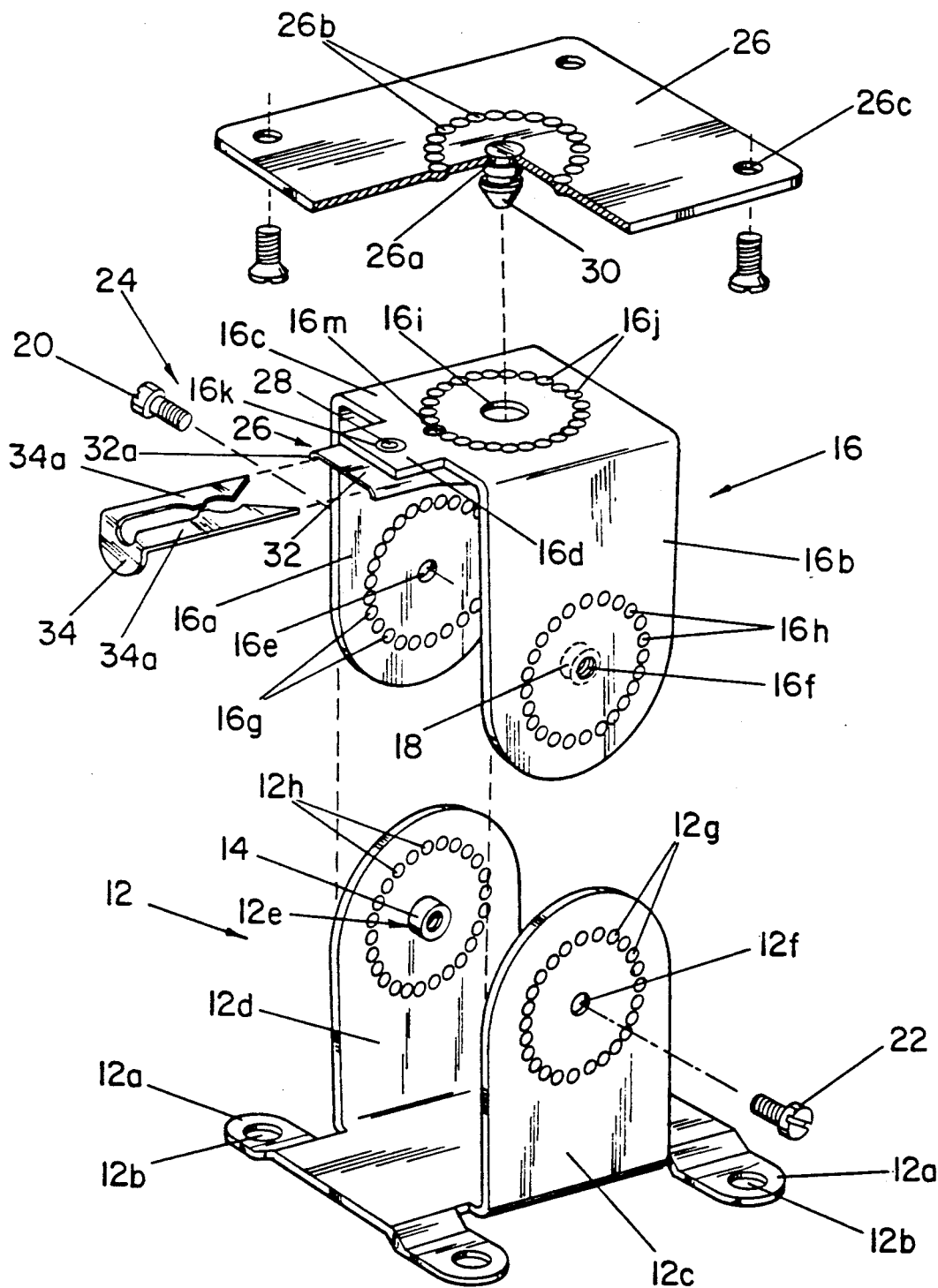
FIG. 2 is an exploded view of the first embodiment shown in FIG. 1.

A mount 50 constituting a second preferred embodiment of the present invention is shown in FIG. 5. In FIG. 2, elements of the mount 50 that are similar in structure and function to those elements of the mount 10 of the first preferred embodiment, shown in FIGS. 1 through 4, are like-numbered.

In the second preferred embodiment, an elongate extension bar 52 is interposed between the base plate 12 and the clevis 16. The extension bar 52 includes first and second planar, parallel side members 52a and 52b, which extend from an integral web plate 52c. At the lower end of the extension bar 52 there are two coaxial bores, by which the lower end of the extension bar 52 is hinged to the base plate 12 by screws 58 and 60. The lower ends of the side members 52a and 52b include circular arrays of punched detents and corresponding indents 52d and 52e, which engage the cooperable detents/indents 12h and 12g in the upright support arm of base plate 12. Similarly, at the upper end of the extension bar 52 there are coaxial bores and two circular arrays of punched detents/indents 52f and 52g. The upper ends of the side members 52a and 52b are hinged to the clevis 16 by screws 54 and 56. The upper arrays of detents/indents 52f and 52g engage the corresponding arrays of detents/indents 16h and 16g of the clevis 16.

With the second preferred embodiment just described the top mounting plate 26 and the associated handset cradle can be rotated and tilted in the same manner as described above with respect to the mount 10 of the first preferred embodiment, and in addition can be swung through a complete semicircular arc having a radius of several inches.

Figure 6:
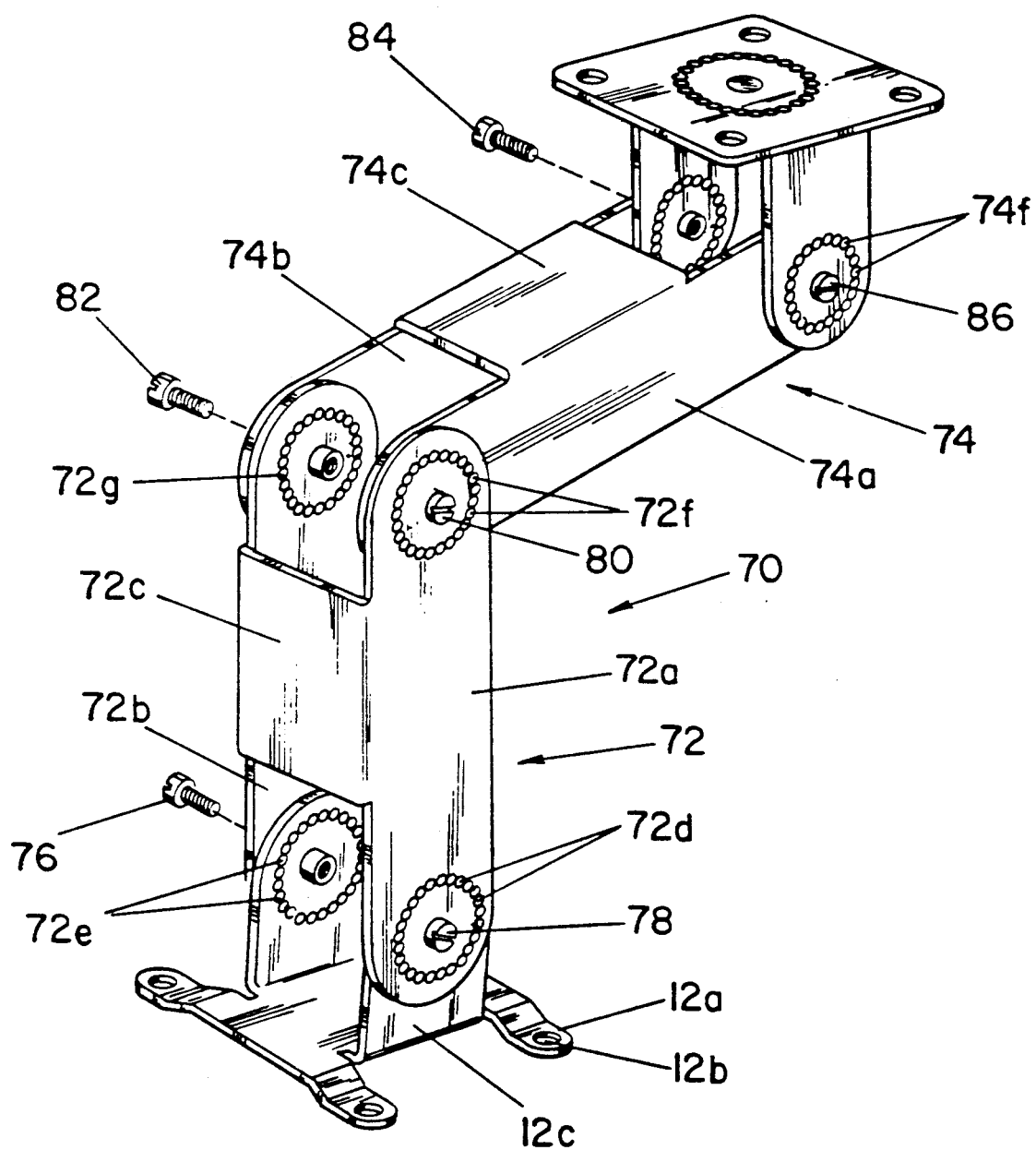
FIG. 6 is an isometric view of a third preferred embodiment of the invention, having two extension bars interposed between the clevis and the base plate.
Figure 7:
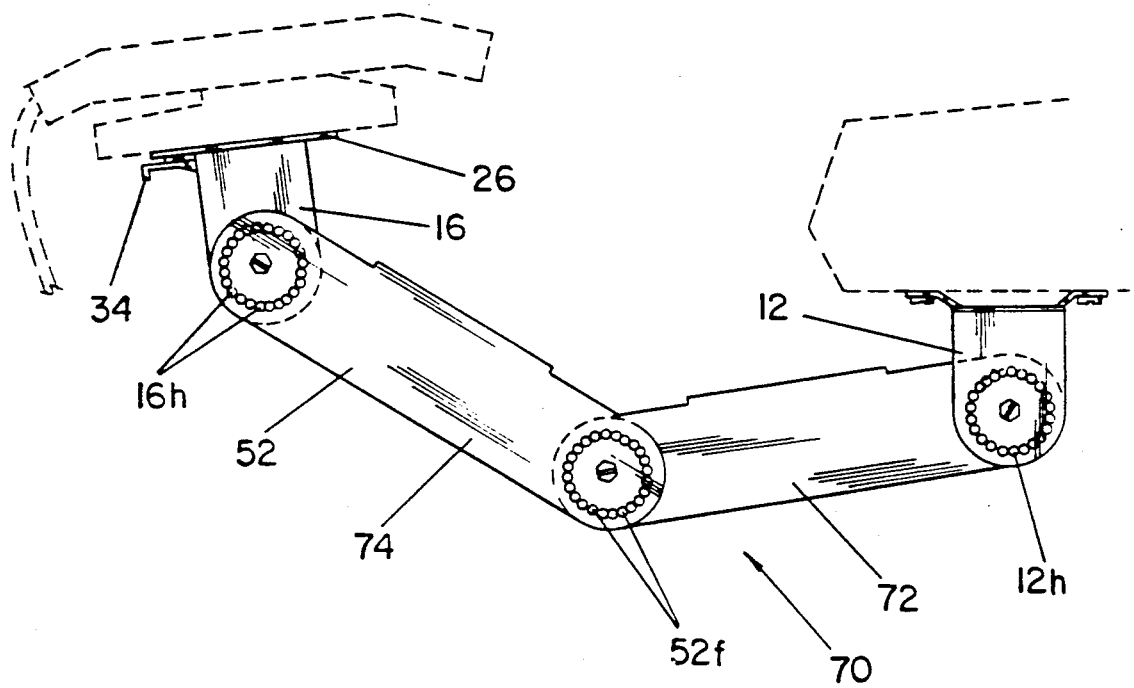
FIG. 7 is a view of the third preferred embodiment, of FIG. 6. as it is installed on the underside of a vehicle dashboard.

A mount 70 constituting a third preferred embodiment of the cradle mount of the present invention is shown in FIGS. 6 and 7. In FIGS. 6 and 7, elements of mount 70 that are the same as those shown in the cradle mount 10 of FIGS. 1 through 4, with respect to the first preferred embodiment, are like-numbered. The mount 70 of the third preferred embodiment is characterized by having upper and lower extension arms 72 and 74, each of which is provided with the same swivel-and-lock assemblies as have been described above with respect to the other preferred embodiments.

More specifically, the lower extension arm 72 includes integral side members 72a and 72b, with arrays of punched detents/indents 72d and 72e at their lower ends, respectively; and arrays of punched detents/indents 72f and 72g at their upper ends. Likewise, the upper arm 74 includes side members 74a and 74b, an integral center plate 74c, and lower arrays of detents/indents (not shown). At the upper ends of the side members 74a and 74b are circular arrays of punched detents/indents (not shown).

The lower extension arm 72 is hinged at its lower end to the base plate 12 by screws 76 and 78. The upper end of the lower extension arm 72 is connected to the lower end of upper extension arm 74 by means of screws 80 and 82. The upper end of the upper extension arm 74 is connected to the clevis 16 by a pair of screws 84 and 86. All of the foregoing connections are made using screw thread nuts in the same manner as described above, with respect to the first preferred embodiment, for connecting the base plate 12 to the clevis 16.

This third embodiment of mount 70 is particularly adapted to mounting to the underside of a dashboard, such that the extension arms 72 and 74 can extend out from under the dashboard and allow the clevis 16, top plate 26 and associated cradle to be tilted to a comfortable angle, as shown for example in FIG. 7. It will be appreciated that the upper and lower extension arms 72 and 74 also enable the mount 70 to be attached to the floor, center transmission housing, or center console of an interior vehicle cab. The extension arms 72 and 74 may be operated and secured in position in a scissors-like manner to enable the height of the mounting plate 26 and associated cradle to vary over a range of approximately four to nine inches; and in addition enable the mounting plate 26 and attached cradle to be positioned along an arc having a radius as large as approximately nine inches. This is in addition to the tilting and rotational positioning that is enabled by the clevis 16 and rotatable top mounting plate 26, as described above with respect to the mount 10 of the first preferred embodiment.

It will be appreciated that the several embodiments of the cradle mount described above will enable a cellular or other telephone handset to be positioned and satisfactorily oriented in a wide variety of vehicles, while also obtaining comfortable, convenient and fully adjustable positioning of the cradle. The swivel and lock assembly of the present invention provides strong and vibration-resistant connection between the several parts of the mount, while nevertheless facilitating installation and subsequent adjustment of the mount.

Figure 8:
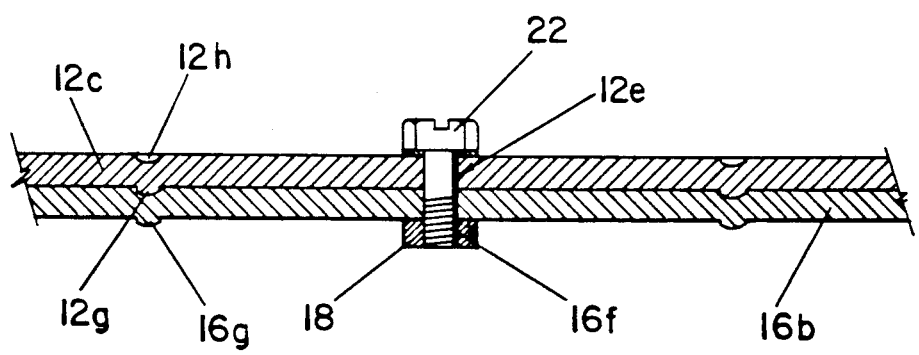
FIG. 8 is a cross-sectional view of indent and detent structure particularly adapted to the invention.

FIG. 8 illustrates in detail the particularly useful and unique circular arrays of punched indents and detents which center around bores in accordance with the invention. One side of each array carrying plate, such as 12c, 12d, 16b, or the like, contains indents, such as 12g and the other detents, such as 12h. Thus, each plate, when punched, is provided with both indents and detents. Preferably, the punched detents and indents are generally rounded or hemispherical and are sized to snugly-fit into or complement one another.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A cradle mount for a telephone handset cradle, comprising:
   a base plate having a pair of upwardly extending support arms, each arm provided with a plurality of rounded indents and corresponding detents;
   means for securing said base plate to a surface;
   a clevis provided with a plurality of rounded indents and corresponding detents hingeably attached to said support arms;
   a mounting plate adapted to be affixed to a telephone handset cradle; and
   means for detachably fastening said mounting plate to said clevis, where said detachable fastening means comprises a snap slide fastener comprising a slide plate affixed to said clevis, said slide plate retainably bearing a slidable latch, and a stud extending from said mounting plate through a bore in said clevis, said latch being selectively engageable with said stud to affix said mounting plate to said clevis.

2. The cradle mount defined in claim 1 wherein said clevis and said mounting plate comprise circular arrays of cooperable detents and indents, which engage one another to enable said mounting plate to be selectively rotated about said clevis and secured to said clevis in a variety of different rotational orientations.

3. The cradle mount defined in claim 1 further comprising first and second elongate extension bars connecting said clevis with said base plate, said first elongate extension bar being pivotably connected at one end to said base plate and being pivotably connected at its opposite end to said second elongate extension bar, and the distal end of said second elongate extension bar from said first elongate extension bar being pivotably connected to said clevis.

4. The cradle mount defined in claim 1 further comprising an elongate extension bar connecting said base plate to said clevis, said elongate extension bar having first and second side members, each having coaxial bores at the opposite ends thereof, said elongate extension bar being pivotably connected by said coaxial bores to said clevis at one end, and being pivotably connected by said coaxial bores at the opposite end to said base plate.

* * * * *